(12) United States Patent
Xhafa et al.

(10) Patent No.: US 7,796,566 B2
(45) Date of Patent: Sep. 14, 2010

(54) METHODS AND APPARATUS TO PERFORM DYNAMIC CHANNEL MANAGEMENT AND DYNAMIC BANDWIDTH CHANGES IN WIRELESS LOCAL AREA NETWORKS

(75) Inventors: Ariton E. Xhafa, Plano, TX (US); Manish Airy, New Delhi (IN); Harshal Shantanu Chhaya, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 724 days.

(21) Appl. No.: 11/452,842

(22) Filed: Jun. 14, 2006

(65) Prior Publication Data
US 2006/0291432 A1  Dec. 28, 2006

Related U.S. Application Data

(60) Provisional application No. 60/692,953, filed on Jun. 22, 2005, provisional application No. 60/693,327, filed on Jun. 23, 2005, provisional application No. 60/699,831, filed on Jul. 15, 2005.

(51) Int. Cl.
  *H04J 3/00* (2006.01)
  *H04W 4/00* (2009.01)
(52) U.S. Cl. ........................................ 370/336; 370/329
(58) Field of Classification Search .................. 370/336, 370/465, 229, 329, 338, 389; 455/574, 418
See application file for complete search history.

(56) References Cited

U.S. PATENT DOCUMENTS

| | | | |
|---|---|---|---|
| 7,177,294 B2 * | 2/2007 | Chen et al. | 370/338 |
| 2004/0253996 A1 * | 12/2004 | Chen et al. | 455/574 |
| 2006/0146869 A1 * | 7/2006 | Zhang et al. | 370/465 |

OTHER PUBLICATIONS

"Indoor WLAN Design", Part III: Understanding the 802.11 MAC, Kjell Jorgen Hole, Jan. 22, 2006, 38 Pages.
"20/40 MHz Channel Management Scheme for .11n", NTT Access Network Service Systems Labs, 18 Pages.
U.S. Appl. No. 11/452,526, filed Jun. 14, 2006, Xhafa et al.

\* cited by examiner

*Primary Examiner*—George Eng
*Assistant Examiner*—Michael Faragalla
(74) *Attorney, Agent, or Firm*—Steven A. Shaw; W. James Brady; Frederick J. Telecky, Jr.

(57) ABSTRACT

Methods and apparatus to perform dynamic channel management and dynamic bandwidth changes in wireless local area networks are disclosed. A disclosed example method comprises deciding at an access point to initiate at least one of a bandwidth change or a channel assignment change; and sending a frame to initiate the at least one of the bandwidth change or the channel assignment change from the access point to one or more stations of a wireless network, the frame including a first field to identify a first channel and a second field to identify a second channel.

8 Claims, 7 Drawing Sheets

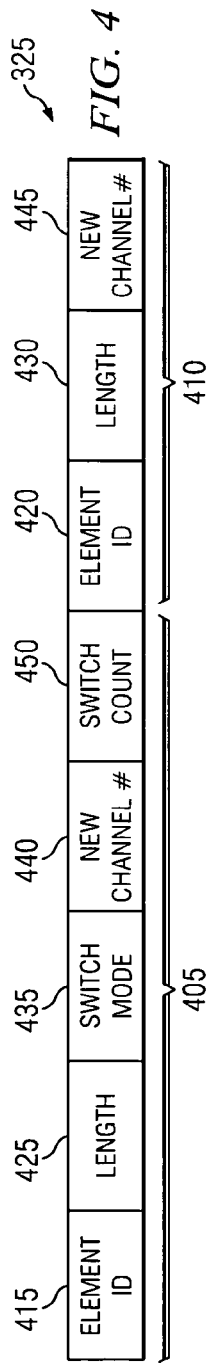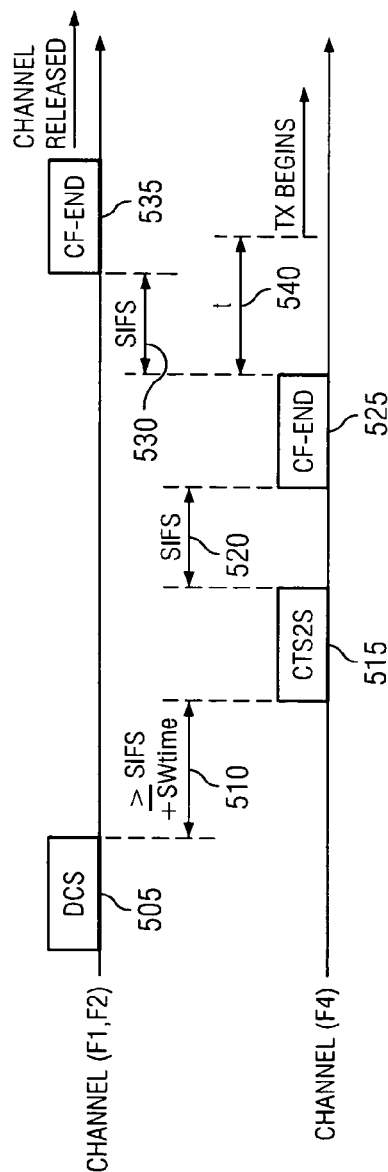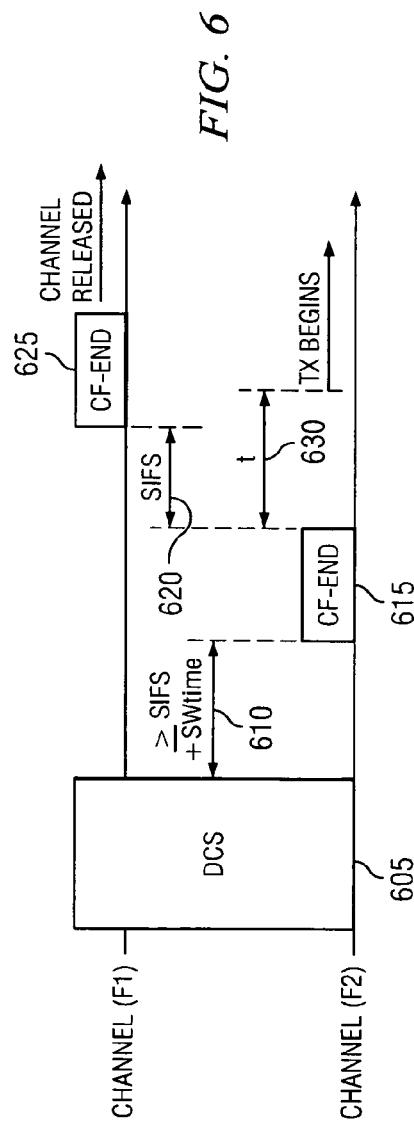

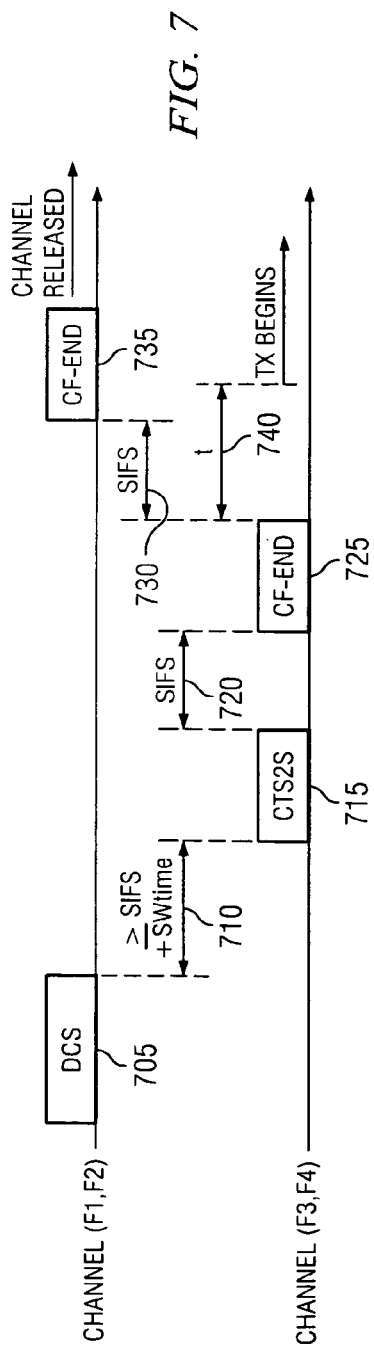

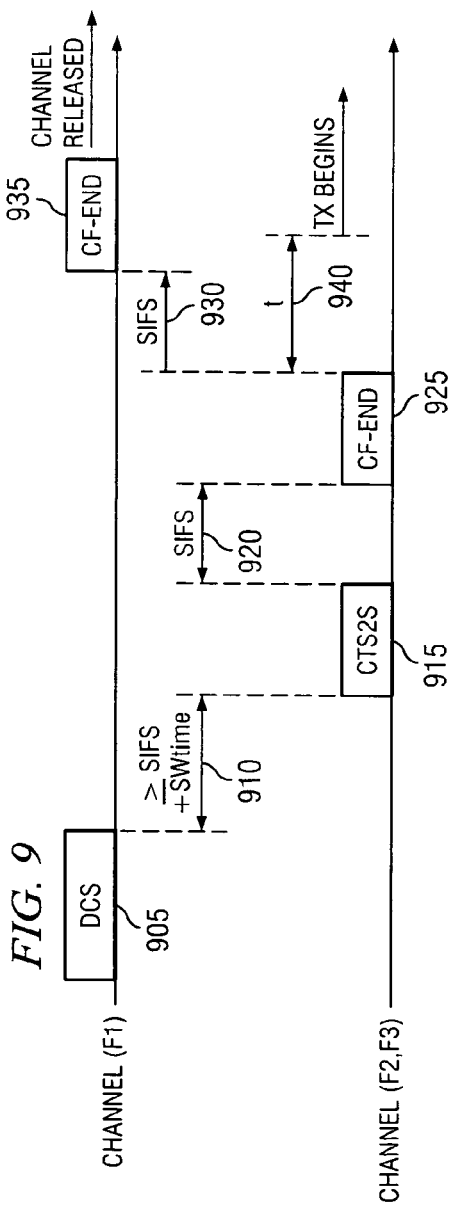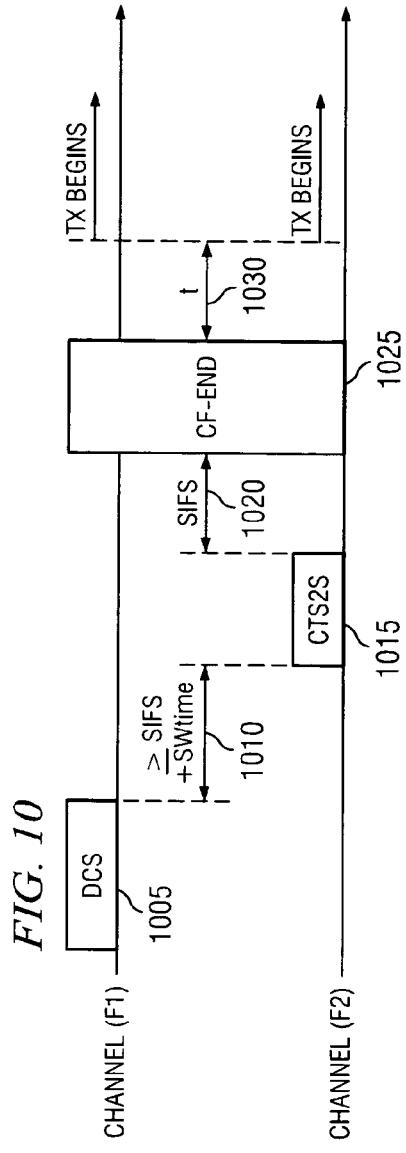

US 7,796,566 B2

METHODS AND APPARATUS TO PERFORM DYNAMIC CHANNEL MANAGEMENT AND DYNAMIC BANDWIDTH CHANGES IN WIRELESS LOCAL AREA NETWORKS

RELATED APPLICATIONS

This patent claims priority from U.S. Provisional Application Ser. No. 60/692,953, entitled "Dynamic channel management in wireless local area networks" which was filed on Jun. 22, 2005; U.S. Provisional Application Ser. No. 60/693,327, entitled "Dynamic channel management in wireless local area networks" which was filed on Jun. 23, 2005; and U.S. Provisional Application Ser. No. 60/699,831, entitled "Dynamic channel management in wireless local area networks" which was filed on Jul. 15, 2005. U.S. Provisional Application Ser. Nos. 60/692,953, 60/693,327 and 60/699,831 are hereby incorporated by reference in their entireties.

FIELD OF THE DISCLOSURE

This disclosure relates generally to wireless local area networks (WLANs) and, more particularly, to methods and apparatus to perform dynamic channel management and dynamic bandwidth changes in WLANs.

BACKGROUND

Wireless local area networks (WLANS) have evolved to become a popular networking technology of choice for residences, enterprises, commercial and/or retail locations (e.g., hotspots). An example WLAN is based on the Institute of Electrical and Electronics Engineers (IEEE) 802.11x family of standards. Today, the IEEE 802.11x family of standards collectively encompass a wide range of physical layer technologies, medium access controller (MAC) protocols and data frame formats. Additionally, newer standards may include features that are not necessarily compatible with existing devices that implement one or more earlier standards.

BRIEF DESCRIPTION OF THE DRAWINGS

FIG. 4 is an example CSA.

FIGS. 5-10 illustrate example dynamic bandwidth change and/or dynamic channel switch scenarios for the example WLAN of FIG. 1.

DETAILED DESCRIPTION

Figure 1:
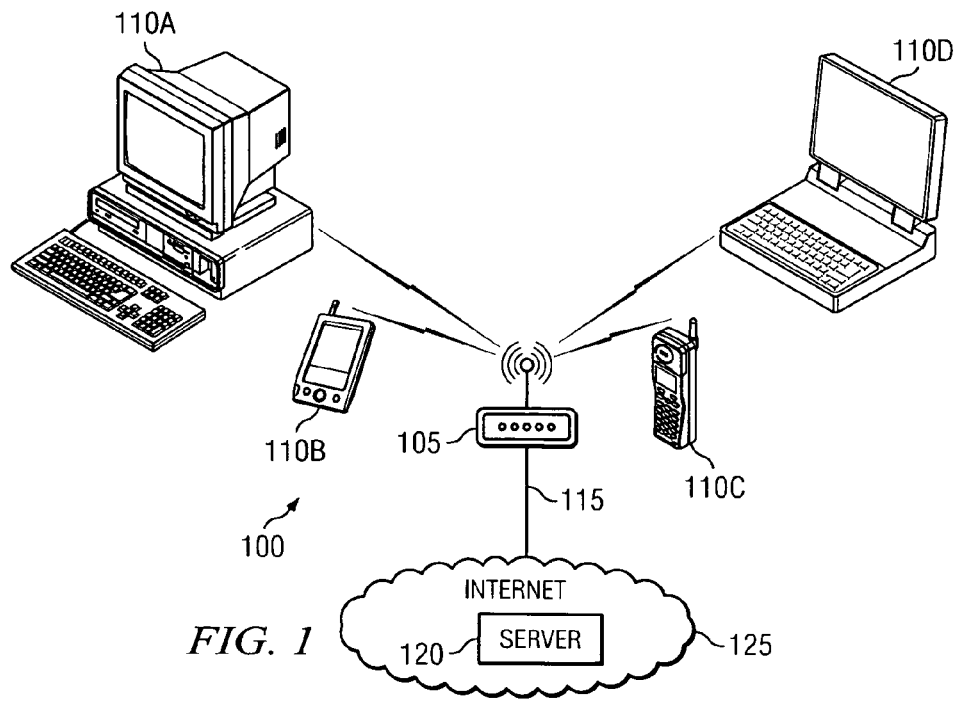
FIG. 1 is a diagram of an example wireless local area network (WLAN) with an access point and a plurality of wireless stations constructed in accordance with the teachings of the invention.

FIG. 1 is a schematic diagram of an example wireless local area network (WLAN) 100. To provide wireless data and/or communication services (e.g., telephone services, Internet services, data services, messaging services, instant messaging services, electronic mail (email) services, chat services, video services, audio services, gaming services, etc.), the example WLAN 100 of FIG. 1 includes an access point (AP) 105 and any of a variety of fixed-location and/or mobile wireless stations (STAs), four of which are respectively designated in FIG. 1 with reference numerals 110A, 110B, 110C and 110D. Example mobile STAs include a personal digital assistant (PDA) 110B, an MP3 player such as an iPod®, a wireless telephone 110C (e.g., a cellular phone, a voice over Internet Protocol (VoIP) phone, a smart phone, etc.), a laptop computer 110D with wireless communication capabilities, etc. Example fixed-location STAs include, for example, any variety of personal computer (PC) 110A with wireless communication capabilities.

The example AP 105 and/or each of the example STAs 110A-D of FIG. 1 are implemented in accordance with one or more past, present and/or future wired and/or wireless communication standards (e.g., one or more past, present and/or future standards from the IEEE 802.11x family of standards) and/or features from one or more of those standards. Moreover, the AP 105 and/or each of the STAs 110A-D may implement a similar and/or a different set and/or combination of the IEEE 802.11x standards as the AP 105 and/or any of the other STAs 110A-D. For example, the example laptop 110D and the example PDA 110B of the illustrated example support 20 million cycles per second (MHz) wireless signals and/or 40 MHz wireless signals (e.g., IEEE 802.11n) while the example PC 110A of the illustrated example supports only 20 MHz wireless signals (e.g., a standard pre-dating IEEE 802.11n). To facilitate compatibility between older STAs 110A-D (e.g., a PC 110A that only supports 20 MHz signals) and newer STAs (e.g., a laptop 110D or PDA 110B that support 20 MHz and/or 40 MHz signals, that is, dual mode devices), the example WLAN 100 of FIG. 1 implements methods and apparatus to facilitate dynamic channel changes and/or dynamic bandwidth changes. In particular, the example WLAN 100 of the illustrated example implements methods and apparatus that, while facilitating interoperability with any of the example STAs 110A-D that do not support 40 MHz operation, (a) allow the WLAN 100 to be switched back and forth between 20 MHz and 40 MHz operation and/or (b) allow the example AP 105 to dynamically change channel assignments for both 20 MHz and 40 MHz modes of operation.

In the example of FIG. 1, to allow the plurality of STAs 110A-D to communicate with devices and/or servers located outside the example WLAN 100, the example AP 105 is communicatively coupled via any of a variety of communication paths 115 to, for example, any of a variety of servers 120 associated with public and/or private network(s) such as the Internet 125. The example server 120 may be used to provide, receive and/or deliver, for example, any variety of data, video, audio, telephone, gaming, Internet, messaging, electronic mail, etc. service. Additionally or alternatively, the example WLAN 100 of FIG. 1 may be communicatively coupled to any of a variety of public, private and/or enterprise communication network(s), computer(s), workstation(s) and/ or server(s) to provide any of a variety of voice service(s), data service(s) and/or communication service(s).

While a single AP 105 is illustrated in the example of FIG. 1, persons of ordinary skill in the art will readily appreciate that the example WLAN 100 could include any of a variety of APs 105. For example, to provide wireless data and/or communication services over a site, location, building, geographic area and/or geographic region, a plurality of communicatively coupled APs 105 could be utilized. For example, a plurality of APs 105 could be arranged in a pattern and/or grid with abutting and/or overlapping coverage areas such that any of a variety of fixed-location STAs 110A-D and/or mobile STAs 110A-D located in, and/or moving through and/or within an area communicatively covered by one or more of the plurality of APs 105 can communicate with at least one of the APs 105.

While this disclosure refers to the example WLAN 100, the example AP 105 and/or the example STAs 110A-D of FIG. 1, the example WLAN 100 of FIG. 1 may be used to provide services to, from and/or between any alternative and/or additional wired and/or wireless communication devices (e.g., telephone devices, personal digital assistants (PDA), laptops, etc.). Additionally, although for purposes of explanation, this disclosure refers to the example WLAN 100, the example AP 105 and/or the example STAs 110A-D illustrated in FIG. 1, any additional and/or alternative variety and/or number of communication systems, communication devices and/or communication paths may be used to implement a WLAN and/or provide data and/or communication services. Moreover, while the this disclosure references 20 MHz devices, 40 MHz devices and/or dual-mode 20/40 MHz devices, persons of ordinary skill in the art will appreciated that devices operating with any other bandwidth(s) may additionally or alternatively be employed.

Similarly, while for purposes of illustration, this disclosure references performing dynamic channel changes and/or switches, and/or dynamic bandwidth changes for the example WLAN 100, persons of ordinary skill in the art will readily appreciate that the methods and apparatus disclosed herein may additionally or alternatively be applied to any type of wired and/or wireless communication system and/or network.

Figure 2:
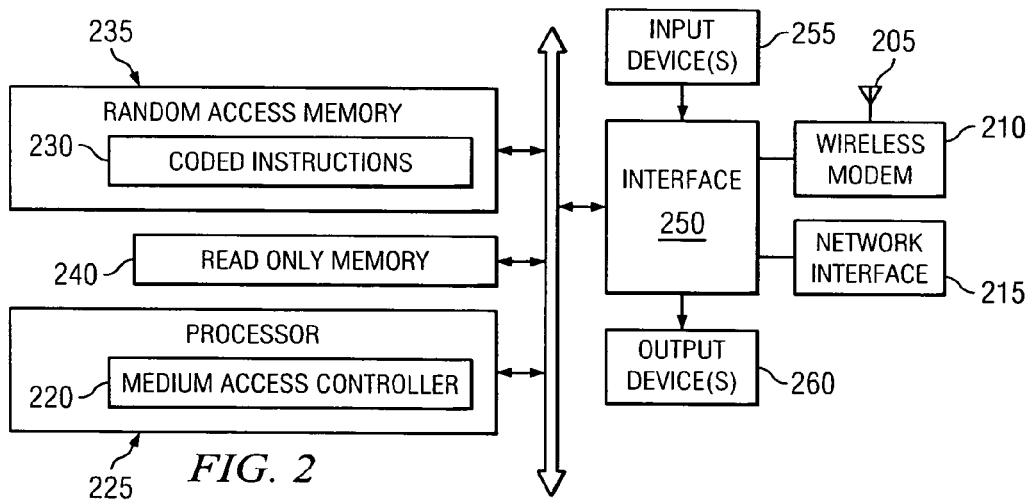
FIG. 2 illustrates an example manner of implementing an example access point and/or an example wireless station of FIG. 1.

FIG. 2 illustrates an example manner of implementing any of the example AP 105 and/or the example STAs 110A-D of FIG. 1. For ease of discussion, the example device of FIG. 2 will be referred to as an AP/STA to make clear that the device may be either an AP 105 and/or a STA 110A-D. To support wireless communications with the example AP 105 and/or one or more of the example STAs 110A-D of the example WLAN 100 of FIG. 1, the example AP/STA of FIG. 2 includes any of a variety of radio frequency (RF) antennas 205 and any of a variety of physical-layer wireless modems 265 that supports 20 MHz and/or 40 MHz wireless signals, wireless protocols and/or wireless communications (e.g., according to IEEE 802.11n). The example RF antenna 205 and the example wireless modem 210 of FIG. 2 are able to receive, demodulate and decode WLAN signals transmitted to and/or within the example WLAN 100 of FIG. 1. Likewise, the wireless modem 210 and the RF antenna 205 are able to encode, modulate and transmit 20 MHz and/or 40 MHz WLAN signals from the example AP/STA to the example AP 105 and/or any or all of the example STAs 110A-D of the example WLAN 100 of FIG. 1. Thus, as commonly referred to in the industry, the example RF antenna 205 and the example wireless modem 210 collectively implement the "physical layer" for the example AP/STA of FIG. 2. Example methods and apparatus to implement the example wireless modem 210 of FIG. 2 are described in U.S. patent application Ser. No. 11/452,526, entitled "Methods and Apparatus to Perform Transmission Bandwidth Detection in Wireless Local Area Networks, and filed Jun. 14, 2006, which is hereby incorporated by reference in its entirety.

To communicatively couple the example AP/STA of FIG. 2 to another device and/or network (e.g., a local area network (LAN), the Internet 125, etc.), the example AP/STA of FIG. 2 includes any of a variety of network interface 215. An example network interface 215 operates in accordance with any of the IEEE 802.3x family of standards.

Figure 13:
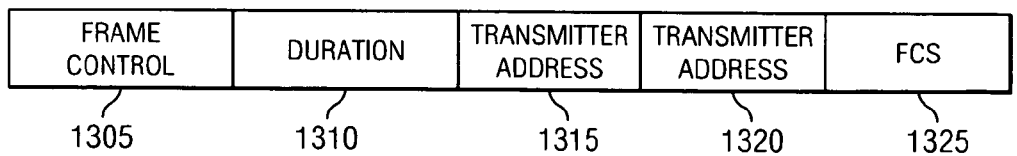
FIG. 13 is an example request-to-self (RTS) frame.
Figure 14:
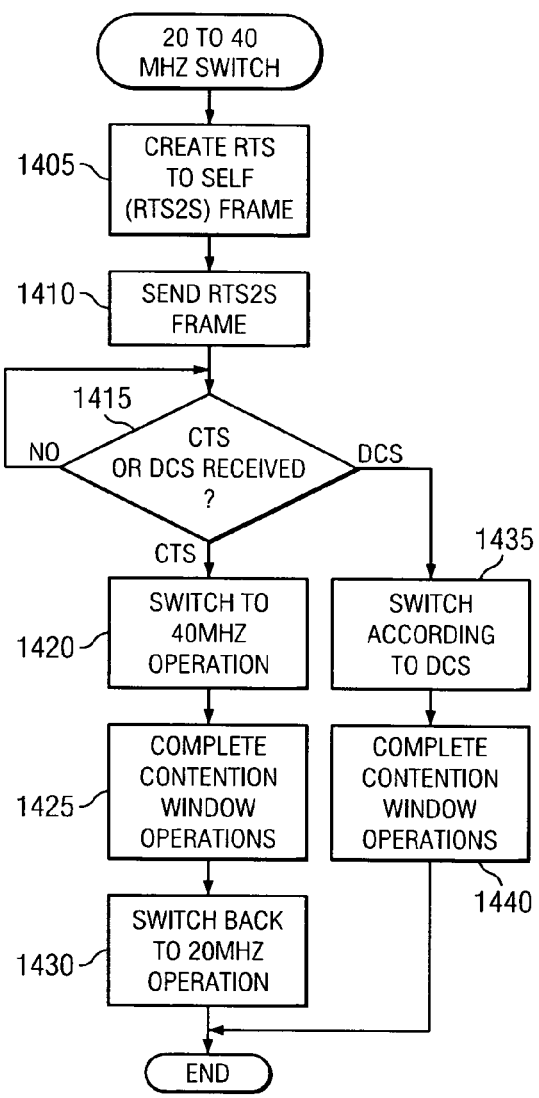
FIGS. 14 and 15 are flowcharts representative of example machine accessible instructions that may be executed to implement the example access point and the example wireless stations, respectively, and/or, more generally, to perform a dynamic bandwidth change for the example WLAN of FIG. 1.
Figure 15:
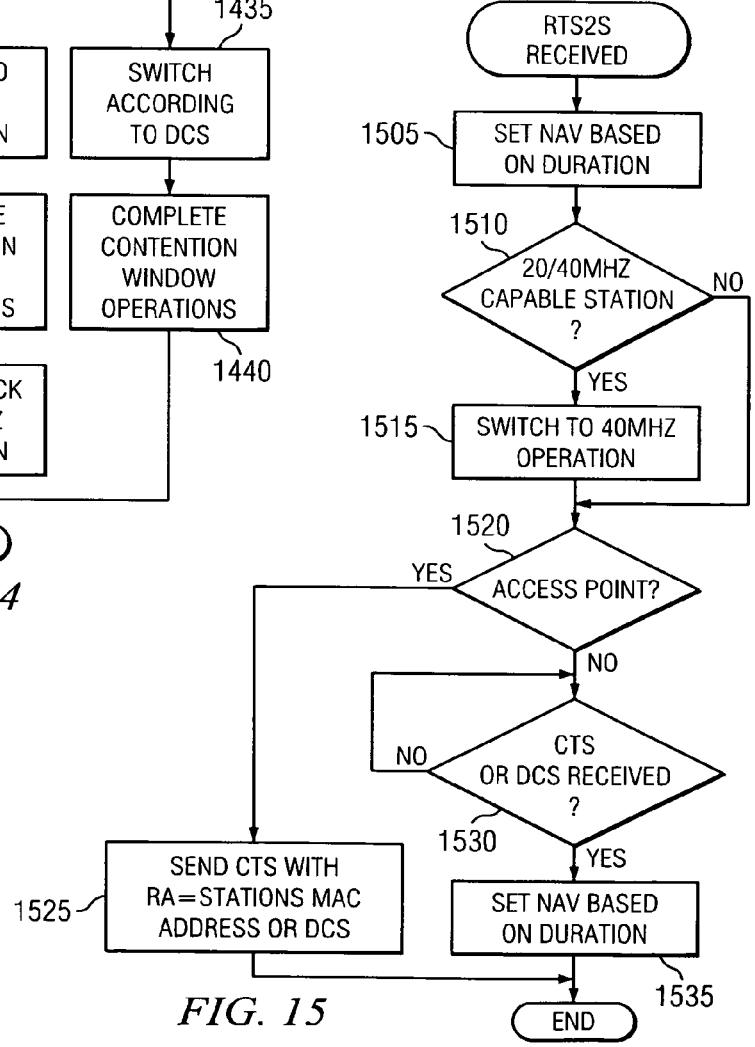

To provide medium access controller (MAC) functionality, the example AP/STA of FIG. 2 includes a MAC 220. In addition to MAC functions well known to persons of ordinary skill in the art, the example MAC 220 implements, executes and/or carries out functionality to facilitate, direct and/or cooperate in dynamic channel switches and/or dynamic bandwidth changes for the example WLAN 100 of FIG. 1. Example methods of implementing the example MAC 220 are discussed below in connection with FIGS. 3-15. In particular, FIGS. 3-12 illustrate example methods for the example AP 105 to initiate and/or direct dynamic channel switches and/or dynamic bandwidth changes. FIGS. 13-15 illustrate example methods for the example STAs 110A-D to dynamically initiate bandwidth changes for a subsequent contention period and/or window. Following the subsequent contention period and/or window, the bandwidth of the example WLAN 100 of FIG. 1 automatically reverts to the operational bandwidth in effect prior to the initiated change. However, persons of ordinary skill in the art will readily recognize that the bandwidth change initiated by a STA 110A-D could alternatively remain in effect beyond the contention period and/or window. For example, the bandwidth change could automatically remain in effect and/or the example AP 105 using, for example, the methods of FIGS. 3-12 could explicitly make the bandwidth change effective beyond the subsequent contention period and/or window.

To implement the example MAC 220 using one or more of any of a variety of software, firmware, processing thread(s) and/or subroutine(s), the example AP/STA of FIG. 2 includes a processor 225. The processor 225 may be one or more of any of a variety of processors such as, for example, a microprocessor, a microcontroller, a digital signal processor (DSP), an advanced reduced instruction set computing (RISC) machine (ARM) processor, etc. The example processor 225 of FIG. 2 executes coded instructions 230 which may be present in a main memory of the processor 225 (e.g., within a random-access memory (RAM) 235) and/or within an on-board memory of the processor 225. The processor 225 may carry out, among other things, the example machine accessible instructions illustrated in FIGS. 11, 12, 14 and/or 15. While in the illustrated example of FIG. 2, the example MAC 220 is implemented by executing one or more of a variety of software, firmware, processing thread(s) and/or subroutine(s) with the example processor 225, the example MAC 220 may be, additionally or alternatively, implemented using an application specific integrated circuit (ASIC), a programmable logic device (PLD), a field programmable logic device (FPLD), discrete logic, hardware, firmware, etc. Also, some or all of the example MAC 220 may be implemented manually or as combinations of any of the foregoing techniques, for example, the MAC 220 may be implemented by a combination of firmware, software and/or hardware.

The processor 225 is in communication with the main memory (including the RAM 235 and a read-only memory (ROM) 240) via a bus 245. The RAM 235 may be implemented by DRAM, SDRAM, and/or any other type of RAM device. The ROM 240 may be implemented by flash memory and/or any other desired type of memory device. Access to the memories 235 and 240 is typically controlled by a memory controller (not shown). The RAM 235 may be used, for example, to store the channel assignment and/or bandwidth configuration information, data and/or parameters. One such example parameter is the network allocation vector (NAV) which is used by the example WLAN 100 for transmission reservations to reduce and/or manage network congestion and/or contentions. The NAV may be implemented as, for example, a countdown timer and can be used to determine when bandwidth of the example WLAN 100 is available for use by the example AP 105 and/or any or all of the example STAs 110A-D.

The example AP/STA of FIG. 2 also includes an interface circuit 250. The interface circuit 250 may implement one or more of a variety of interfaces, such as an external memory interface, serial port, general purpose input/output, etc. Additionally or alternatively, the interface circuit 250 may communicatively couple the example wireless modem 210 and/or the network interface 215 with the processor 225 and/or the example MAC 220.

In the example of FIG. 2, one or more input devices 255 and one or more output devices 260 are connected to the interface circuit 250. Example input devices 255 include a keyboard, touchpad, buttons and/or keypads, etc. Example output devices 260 include a display (e.g., a liquid crystal display (LCD)), a screen, a light emitting diode (LED), etc.

While an example AP/STA has been illustrated in FIG. 2, the elements, modules, logic, memory and/or devices illustrated in FIG. 2 may be combined, re-arranged, eliminated and/or implemented in any of a variety of ways. Further, the example interface 250, the example wireless modem 210, the example network interface 215, the example MAC 220 and/or, more generally, the example AP/STA may be implemented by hardware, software, firmware and/or any combination of hardware, software and/or firmware. Moreover, the AP/STA may include additional elements, modules, logic, memory and/or devices than those illustrated in FIG. 2 and/or may include more than one of any or all of the illustrated elements, modules and/or devices.

Figure 3:
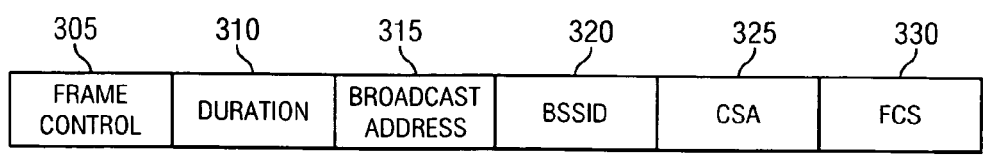
FIG. 3 is an example dynamic channel switch (DCS) frame including a channel switch announcement (CSA).

FIGS. 3 and 4 illustrate an example WLAN frame that may be used to initiate dynamic bandwidth change(s) and/or channel assignment change(s) for the example WLAN 100 of FIG. 1. FIGS. 3 and 4 illustrate an example dynamic channel switch (DCS) frame that contains a channel switch announcement (CSA). FIG. 4 illustrates the example CSA 325 of FIG. 3 in more detail. As discussed below in connection with FIGS. 5-10, the example DCS frame illustrated in FIGS. 3 and 4 may be used to dynamically change channel assignment(s) and/or to dynamically change back and forth between 20 MHz and 40 MHz operation.

To specify the variety and/or type of the example frame of FIG. 3, the example DCS frame includes a frame control field 305 that includes, among other things, type and sub-type sub-fields that identify the variety and/or type of the frame. In the example frame of FIG. 3, the type and sub-type sub-fields contain values that specify a CTS frame.

To identify the time duration over which the dynamic channel assignment change will take place and, thus, the time duration for which the wireless channel(s) are reserved, the example DCS frame of FIG. 3 includes a duration field 310. The example duration field 310 is used by STAs 110A-B receiving the example DCS frame to set and/or update their NAV.

To identify to whom the example frame of FIG. 3 is sent, the example DCS frame includes a receiver address field 315.

The example address field 315 of FIG. 3 contains a value that represents the broadcast group address for the example WLAN 100 of FIG. 1. In the illustrated example of FIG. 1, the broadcast group address is used so that all of the example STAs 110A-D receive and/or process the example DCS frame. That is, the example AP 105 broadcasts the example DCS frame to all of its STAs 110A-D. To identify who sent the example DCS frame of FIG. 3, the example frame includes a transmitter address field 320. The example address field 320 of FIG. 3 contains a value that represents the MAC address of the example AP 105 (i.e., the basic service set identifier (BSSID) of the example WLAN 100).

To specify the new channel assignments for 20 and/or 40 MHz wireless signals, the example DCS frame of FIG. 3 includes a channel switch announcement (CSA) 325. An example CSA 325 is discussed below in connection with FIG. 4.

To allow receiving STAs 110A-D to verify the integrity of the example DCS frame of FIG. 3, the example frame includes a frame check sequence (FCS) field 330. The example FCS 330 contains a value that represents a cyclic redundancy check (CRC) value computed based on the example frame of FIG. 3 exclusive of the FCS field 330.

FIG. 4 illustrates an example CSA 325 for the example DCS frame of FIG. 3. As illustrated in FIG. 4, the example CSA 325 contains a first portion 405 and a second portion 410. The first portion 405 and/or the second portion 410 can be used to initiate respective channel changes. To identify the first portion 405 as containing channel change information, the first portion 405 includes a first element identifier (ID) field 415 having a value of, for example, thirty-seven (37) that indicates the first portion 405 as a CSA in accordance with the 802.11x family of standards. Likewise, the second portion 410 includes a second element ID field 420 that identifies the second portion 410 as containing channel change information. In the example WLAN 100 of FIG. 1, 40 MHz wireless signals are formed using two (2) 20 MHz wireless channels. The example first portion 405 may be used to initiate a channel change for the first 20 MHz channel and the second portion 410 is used to initiate a channel change for the second 20 MHz channel.

If both the first portion 405 and the second portion 410 are sent as part of a particular CSA 325, then the bandwidth in effect after the dynamic bandwidth change and/or dynamic channel switch(es) will be 40 MHz. However, if the second portion 410 is omitted from and/or left empty in a particular CSA 325, then the bandwidth in effect after the dynamic bandwidth change and/or dynamic channel switch(es) will be 20 MHz. Thus, by including or omitting the second portion 410 of the CSA 325, an AP 105 advises the receiving STAs 110A-D whether they are to operate in 20 MHz or 40 MHz mode of operation. The data within the first and second portions 405, 410 of the CSA 325 advises the receiving STAs 110A-D of the channel(s) that have been allocated. If a currently used channel is indicated in a particular CSA 325, then the channel continues to be used after the channel switch(es) and/or bandwidth change designated in the CSA 325 are implemented. Thus, the example CSA 325 of FIG. 3 and/or, more generally, the example DCS of FIGS. 3 and 4 can be used to initiate dynamic bandwidth changes and/or dynamic channel switch(es).

To specify the length of the first portion 405, the example CSA 325 includes a length field 425. The example length field 425 of FIG. 4 contains a value that represents the length of the first portion 405 in bytes exclusive of the element ID field 415 and the length field 425. Likewise, a length field 430 contains a value that represents the length of the second portion 410 in bytes exclusive of the element ID field 420 and the length field 430.

To specify how the channel switches are performed, the example CSA 325 of FIG. 4 includes a switch mode field 435. The example switch mode field 435 of FIG. 4 contains a value that indicates if the channel switch(es) are to be disruptive (i.e., all STAs 110A-D stop transmitting until channel switches are completed) or non-disruptive.

To specify a new and/or continuing channel number for the first 20 MHz channel after the channel switch is completed, the example CSA 325 of FIG. 4 includes a first channel number field 440. Likewise, when second portion 410 is present, the example CSA 325 of FIG. 4 includes a second new channel number field 445 that specifies a new and/or continuing channel number for the second 20 MHz channel after the channel switch is completed.

To schedule the channel switches, the example CSA 325 of FIG. 4 includes a switch count field 450. The example switch count field 450 of FIG. 4 contains a value that represents the number of Beacon frame transmissions intervals to wait before executing the channel switch(es). In the example WLAN 100 of FIG. 1, channel switches are performed just before a Beacon transmission is scheduled to begin. If the example switch count field 450 contains a value of zero (0), then channel switches may occur without any further warning and/or waiting.

FIGS. 5-10 illustrate example dynamic channel switching scenarios for the example WLAN of FIG. 1. The example scenario of FIG. 5 illustrates a switch from 40 MHz operation using channels F1 and F2 to 20 MHz operation using channel F4. To initiate the bandwidth and channel switch illustrated in FIG. 5, the example AP 105 of FIG. 1 broadcasts a DCS frame 505 (e.g., the example DCS frame of FIGS. 3 and 4) to the STAs 110A-D using the current channels F1 and F2. The example AP 105 then waits a time interval 510 having a duration of at least the Short InterFrame Space (SIFS) plus the time necessary for the example wireless modem 210 (FIG. 2) to switch channels and/or bandwidth (i.e., SWtime). During this time interval the STAs 110A-D configure their respective wireless modems 210 to change bandwidth and channel(s).

After waiting for the time interval 510 to expire, the example AP 105 broadcasts a CTS2S frame 515 (e.g., formatted and/or having content in accordance with a prevailing standard) to the STAs 110A-D using the new channel F4. After waiting for another time interval 520 substantially substantially equal in duration to the SIFS, the example AP 105 sends a contention-free end (CF-END) frame 525 (e.g., formatted and/or having content in accordance with a prevailing standard) on the new channel F4. After expiration of yet another time interval 530 substantially equal in duration to the SIFS, the example AP 105 may or may not send a CF-END frame 535 on the old channels F1 and F2 causing the old channels F1 and F2 to be released. Whether or not the example AP 105 sends the CF-END frame 535 depends upon, for example, the implementation of the AP 105. After expiration of a time interval 540 having a duration of t starting from the end of the CF-END frame 525, the AP 105 and/or the STAs 110A-D are free to start using the new channel F4 for 20 MHz wireless communication. In the example of FIG. 5, the duration t is at least SIFS plus the duration of one time slot.

The example scenario of FIG. 6 illustrates a switch from 40 MHz operation using channels F1 and F2 to 20 MHz operation using only channel F2. To initiate the bandwidth and channel switch illustrated in FIG. 6, the example AP 105 of FIG. 1 broadcasts a DCS frame 605 (e.g., the example DCS frame of FIGS. 3 and 4) to the STAs 110A-D using channels F1 and F2. The example AP 105 then waits a time interval 610 having a duration of at least the SIFS plus the SWtime. During this time interval the STAs 110A-D configure their respective wireless modems 210 to change bandwidth and channels specified in the DCS 605. After waiting for the time interval 610 to expire, the example AP 105 sends a CF-END frame 615 (e.g., formatted and/or having content in accordance with a prevailing standard) on the channel F2. After expiration of yet another time interval 620 substantially equal in duration to the SIFS, the example AP 105 sends a CF-END frame 625 on the channel F1 causing the channels F1 to be released. After expiration of a time interval 630 having a duration of t starting from the end of the CF-END frame 615, the AP 105 and/or the STAs 110A-D are free to start using the channel F2 for 20 MHz wireless communication. In the example of FIG. 6, the duration t is at least SIFS plus the duration of one time slot.

The example scenario of FIG. 7 illustrates a channel switch from channels F1 and F2 to channels F3 and F4 without a change in bandwidth. To initiate the channel switches illustrated in FIG. 7, the example AP 105 of FIG. 1 broadcasts a DCS frame 705 (e.g., the example DCS frame of FIGS. 3 and 4) to the STAs 110A-D using the current channels F1 and F2. The example AP 105 then waits a time interval 710 having a duration of at least the SIFS plus the SWtime. During this time interval the STAs 110A-D configure their respective wireless modems 210 to change the new channels specified in the DCS 705. After waiting for the time interval 710 to expire, the example AP 105 broadcasts a CTS2S frame 715 (e.g., formatted and/or having content in accordance with a prevailing standard) to the STAs 110A-D using the new channels F3 and F4. After waiting for another time interval 720 substantially equal in duration to the SIFS, the example AP 105 sends a CF-END frame 725 (e.g., formatted and/or having content in accordance with a prevailing standard) on the new channels F3 and F4. After expiration of yet another time interval 730 substantially equal in duration to the SIFS, the example AP 105 may or may not then send a CF-END frame 735 on the old channels F1 and F2 causing the old channels F1 and F2 to be released. Whether or not the example AP 105 sends the CF-END frame 735 depends upon, for example, the implementation of the AP 105. After expiration of a time interval 740 having a duration of t starting from the end of the CF-END frame 725, the AP 105 and/or the STAs 110A-D are free to start using the new channels F3 and F4 for wireless communication. In the example of FIG. 7, the duration t is at least SIFS plus the duration of one time slot.

The example scenario of FIG. 8 illustrates a channel switch from channels F1 and F2 to channels F2 and F3 without a change in bandwidth. To initiate the channel switches illustrated in FIG. 8, the example AP 105 of FIG. 1 broadcasts a DCS frame 805 (e.g., the example DCS frame of FIGS. 3 and 4) to the STAs 110A-D using the current channels F1 and F2. The example AP 105 then waits a time interval 810 having a duration of at least the SIFS plus the SWtime. During this time interval the STAs 110A-D configure their respective wireless modems 210 to change channels specified in the DCS 805. After waiting for the time interval 810 to expire, the example AP 105 broadcasts a CTS2S frame 815 (e.g., formatted and/or having content in accordance with a prevailing standard) to the STAs 110A-D using the new channel F3. After waiting for another time interval 820 substantially equal in duration to the SIFS, the example AP 105 sends a CF-END frame 825 (e.g., formatted and/or having content in accordance with a prevailing standard) on the channels F2 and F3. After expiration of yet another time interval 830 substantially equal in duration to the SIFS, the example AP 105 may or may not then send a CF-END frame 835 on the old channel F1 causing the old channel F1 to be released. Whether or not the example AP 105 sends the CF-END frame 835 depends upon, for example, the implementation of the AP 105. After expiration of a time interval 840 having a duration of t starting from the end of the CF-END frame 825, the AP 105 and/or the STAs 110A-D are free to start using the channels F2 and F3 for wireless communication. In the example of FIG. 8, the duration t is at least SIFS plus the duration of one time slot.

The example scenario of FIG. 9 illustrates a bandwidth and channel switch from 20 MHz operation using channel F1 to 40 MHz operation using channels F2 and F3. To initiate the channel switches illustrated in FIG. 9, the example AP 105 of FIG. 1 broadcasts a DCS frame 905 (e.g., the example DCS frame of FIGS. 3 and 4) to the STAs 110A-D using the current channel F1. The example AP 105 then waits a time interval 910 having a duration of at least the SIFS plus the SWtime. During this time interval the STAs 110A-D configure their respective wireless modems 210 to change bandwidth and channels specified in the DCS 905. After waiting for the time interval 910 to expire, the example AP 105 broadcasts a CTS2S frame 915 (e.g., formatted and/or having content in accordance with a prevailing standard) to the STAs 110A-D using the new channels F2 and F3. After waiting for another time interval 920 substantially equal in duration to the SIFS, the example AP 105 sends a CF-END frame 925 (e.g., formatted and/or having content in accordance with a prevailing standard) on the new channels F2 and F3. After expiration of yet another time interval 930 substantially equal in duration to the SIFS, the example AP 105 may or may not then send a CF-END frame 935 on the old channel F1 causing the old channel F1 to be released. Whether or not the example AP 105 sends the CF-END frame 935 depends upon, for example, the implementation of the AP 105. After expiration of a time interval 940 having a duration of t starting from the end of the CF-END frame 925, the AP 105 and/or the STAs 110A-D are free to start using the new channels F2 and F3 for 40 MHz wireless communication. In the example of FIG. 9, the duration t is at least SIFS plus the duration of one time slot.

The example scenario of FIG. 10 illustrates a channel switch from 20 MHz operation using channel F1 to 40 MHz operation using channels F1 and F2. To initiate the bandwidth and channel switch illustrated in FIG. 10, the example AP 105 of FIG. 1 broadcasts a DCS frame 1005 (e.g., the example DCS frame of FIGS. 3 and 4) to the STAs 110A-D using the current channel F1. The example AP 105 then waits a time interval 1010 having a duration of at least the SIFS plus the SWtime. During this time interval the STAs 110A-D configure their respective wireless modems 210 to change bandwidth and channel specified in the DCS 1005. After waiting for the time interval 1010 to expire, the example AP 105 sends a CTS2S frame 1015 (e.g., formatted and/or having content in accordance with a prevailing standard) on the channel F1. After expiration of yet another time interval 1020 substantially equal in duration to the SIFS, the example AP 105 sends a CF-END 1025 (e.g., formatted and/or having content in accordance with a prevailing standard) using the channels F1 and F2. After waiting for a time interval 1030 having a duration of t, the AP 105 and/or the STAs 110A-D are free to then start using the new channels F1 and F2 for 40 MHz wireless communication. In the example of FIG. 10, the duration t is at least SIFS plus the duration of one time slot.

While example dynamic bandwidth changes and/or dynamic channel switches have been illustrated in FIGS. 5-10, persons of ordinary skill in the art will readily understand that many other dynamic bandwidth changes and/or dynamic channel switch scenarios can be implemented using the methods and apparatus disclosed herein.

Figure 11:
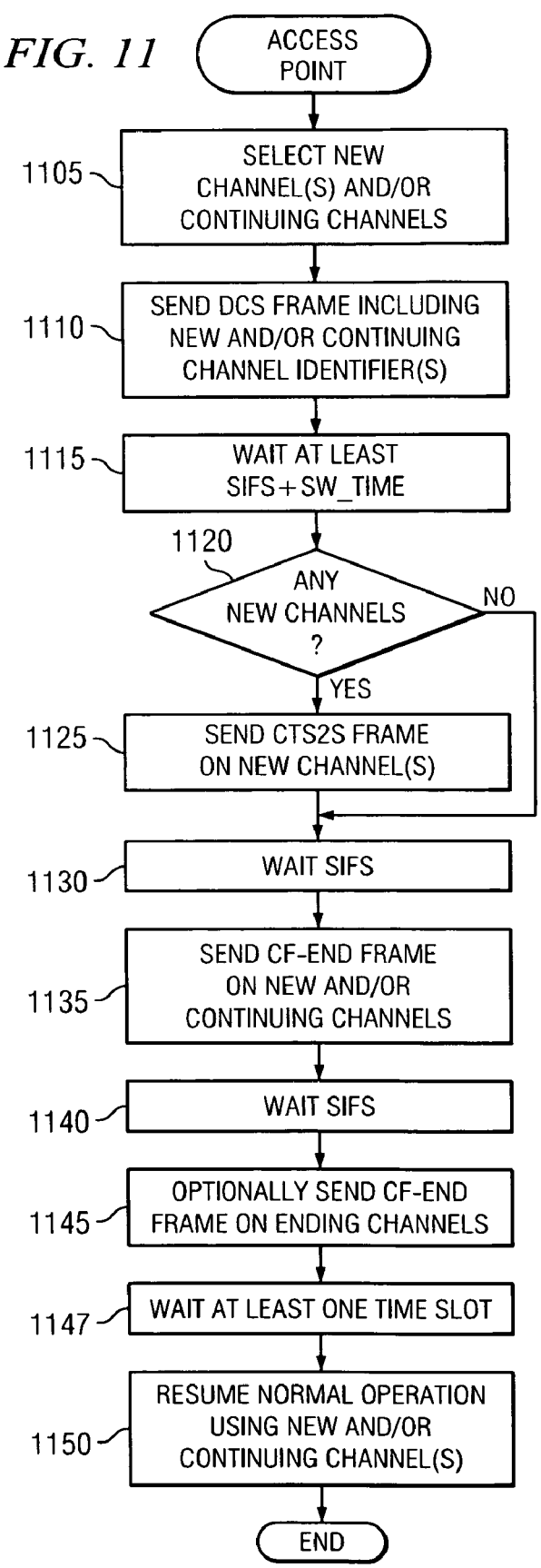
FIGS. 11 and 12 are flowcharts representative of example machine accessible instructions that may be executed to implement the example access point and the example wireless stations, respectively, and/or, more generally, to perform dynamic bandwidth changes and/or dynamic channel switches for the example WLAN of FIG. 1.
Figure 12:
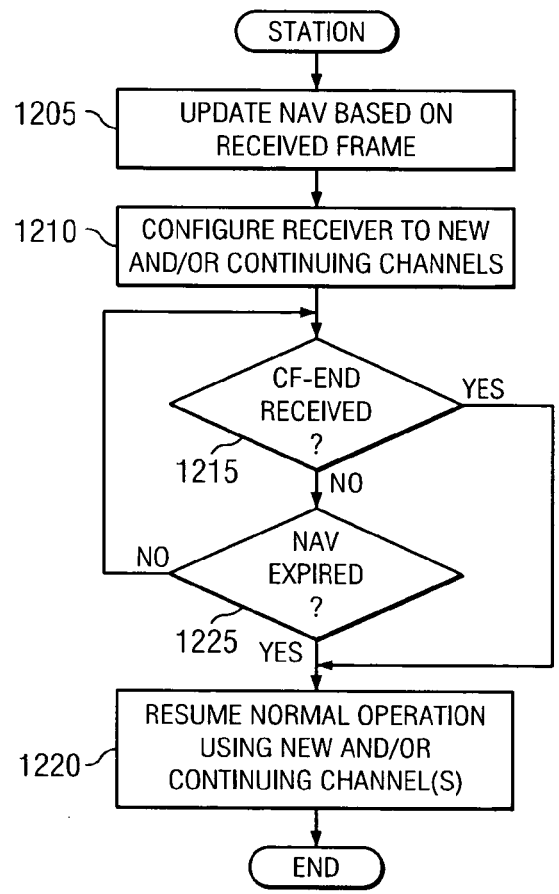

FIGS. 11 and 12 are flowcharts representative of example machine accessible instructions that may be executed to implement the example scenarios of FIGS. 5-10 and/or, more generally, to perform dynamic channel switches and/or dynamic bandwidth changes for the example WLAN 100 of FIG. 1. The example machine accessible instructions of FIGS. 11-12 may be executed by a processor, a controller and/or any other suitable processing device. For example, the example machine accessible instructions of FIGS. 11-12 may be embodied in coded instructions stored on a tangible medium such as a flash memory, or RAM associated with a processor (e.g., the example processor 225 discussed above in connection with FIG. 2). Alternatively, some or all of the example flowcharts of FIGS. 11-12 may be implemented using an ASIC, a PLD, a FPLD, discrete logic, hardware, firmware, etc. Also, some or all of the example flowcharts of FIGS. 11-12 may be implemented manually or as combination(s) of any of the foregoing techniques, for example, a combination of firmware, software and/or hardware. Further, although the example machine accessible instructions of FIGS. 11-12 are described with reference to the flowcharts of FIGS. 11-12, persons of ordinary skill in the art will readily appreciate that many other methods of implementing the example scenarios of FIGS. 5-10 and/or, more generally, to perform dynamic channel switches and/or dynamic bandwidth changes for the example WLAN 100 of FIG. 1 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 11-12 may be carried out sequentially and/or carried out in parallel by, for example, separate processing threads, processors, devices, circuits, etc.

The example machine accessible instructions of FIG. 11 begin when the example AP 105 determines a need and/or desire to change the bandwidth and/or channel(s) for the example WLAN 100 of FIG. 1. Based upon a desired bandwidth (eg., a new and/or continuing bandwidth) and using any of a variety of algorithm(s), method(s) and/or technique(s), the AP 105 selects new and/or continuing channel(s) (block 1105). As discussed above in connection with FIGS. 3 and 4, based upon the new and/or continuing bandwidth and based on the continuing and/or new channel selection(s), the AP 105 creates and broadcasts a DCS frame (e.g., the example DCS frame of FIGS. 3 and 4 populated with appropriate values) on the currently used channel(s) (block 1110). The AP 105 then waits for a time interval having a duration of at least the SIFS plus the SWtime to expire (block 1115).

If no new channel(s) were selected at block 1105 (block 1120), then control proceeds to block 1130. If at least one new channel was selected at block 1105 (block 1120), the AP 105 sends a CTS2S frame on the new channel(s) (block 1125). The AP 105 waits for a time interval having a duration of the SIFS to expire (block 1130), and then sends a CF-END frame on the new and/or continuing channel(s) on which communication is to occur (block 1135).

After waiting for a time interval having a duration of the SIFS to expire (block 1140), the AP 105 may optionally send a CF-END frame on any ending channels (block 1145). After waiting for at least one time slot to pass (block 1147), the AP 105 then resumes normal operations via the new and/or continuing channel(s) (block 1150) and the example machine accessible instructions of FIG. 11 are ended.

The example machine accessible instructions of FIG. 12 begin when a STA (e.g., one of the example STAs 110A-D of FIG. 1) receive a DCS frame (e.g., the example frame of FIGS. 3 and 4 populated with appropriate values) from the example AP 105 of FIG. 1. Based upon a duration field included in the DCS frame (e.g., the example field 315 of FIG. 3), the STA 110A-D sets and/or updates its NAV (block 1205). The STA 110A-D then configures its receiver (e.g., the example wireless modem 210 of FIG. 2) based upon the bandwidth and/or channels specified in the received DCS frame (block 1210).

When a CF-END frame is received on the new and/or continuing channel(s) (block 1215), the STA 110A-D resumes normal WLAN operation using the new and/or continuing channel(s) (block 1220). The example machine accessible instructions of FIG. 12 are then ended.

If a CF-END frame has not been received (block 1215), the STA 110A-D determines if the NAV has expired (block 1225). If the NAV has not expired (block 1225), control returns to block 1215 to check if a CF-END has been received. If the NAV has expired and/or a CF-END has been received (block 1225), the STA 110A-D resumes normal WLAN operation using the new and/or continuing channel(s) (block 1220). The example machine accessible instructions of FIG. 12 are then ended.

FIGS. 13-14 illustrate example methods for the example STAs 110A-D to initiate a dynamic bandwidth change for a subsequent contention period and/or window of the example WLAN 100 of FIG. 1. FIG. 15 illustrates an example method of processing and/or responding to receiving the example RTS2S frame of FIG. 13.

FIG. 13 illustrates an example request-to-send (RTS) to self frame (RTS2S) that may be used by any of the example STAs 110A-D to initiate a dynamic bandwidth change. In the example WLAN 100 of FIG. 1, an initiating STA 110A-D sends the example RTS2S of FIG. 13 to switch the WLAN to 40 MHz operation for the following contention period and/or window. In response to receiving the example RTS2S of FIG. 13, other STAs 110A-D capable of 40 MHz operation may or may not switch to 40 MHz operation.

Upon receiving the example RTS2S of FIG. 13, the example AP 105 of FIG. 1 responds with a CTS frame (e.g., formatted and/or having content in accordance with a prevailing standard) that confirms the 40 MHz operation and includes a duration field used by the STAs 110A-D to set their NAV and, thus, reserve the WLAN 100 for use by the initiating STA 110A-D for the subsequent contention period and/or window. Additionally or alternatively, the example AP 105 may use the methods discussed above in connection with FIGS. 3-12 and respond with a DCS frame that initiates a dynamic bandwidth change and/or dynamic channel switch(es). If the example AP 105 responds with a CTS frame, the initiating STA 110A-D and the AP 105 use the two currently configured channels for the subsequent 40 MHz wireless communication in the ensuing contention period and/or window. However, if the example AP 105 responds with the example DCS frame of FIGS. 3 and 4, the example AP 105 may potentially configure a different set of channels for continuing 40 MHz wireless operation.

To specify the variety of the example frame of FIG. 13, the example frame includes a frame control field 1305 that indicates, among other things, a type and sub-type sub-fields that identify the variety of the frame. In the example frame of FIG. 13, the type and sub-type sub-fields contain values that specify a request to send (RTS) frame.

To identify the time interval over which the example RTS frame is sent and to reserve the wireless channel for a subsequent CTS frame, the example frame of FIG. 3 includes a duration field 1310. The example duration field 1310 is used to set the NAV. Thus, upon receipt of the example frame of FIG. 3, the STAs 110A-D set and/or update their NAV based upon the duration field 1310.

To identify to whom the example frame of FIG. 13 is sent, the example frame includes a receiver address field 1315. As illustrated in FIG. 13, the example receiver address field 1315 contains a value that represents the MAC address of the initiating STA 110A-D that is sending the example RTS frame and, thus, the example RTS frame of FIG. 13 is "addressed to self" and will be referred to herein as an RTS to self (RTS2S) frame. To identify who sent an RTS2S frame, the example RTS2S frame of FIG. 13 includes a transmitter address field 1320. The example transmitter address field 1320 of FIG. 13 contains a value that represents the MAC address of the sending STA 110A-D (i.e., initiating STA 110A-D).

To allow the example AP 105 and/or any receiving STAs 110A-D to verify the integrity of the example frame of FIG. 13, the example RTS2S frame includes a frame check sequence (FCS) field 1325. The example FCS 1325 contains a value that represents a cyclic redundancy check (CRC) value computed based on the example RTS2S frame of FIG. 13 exclusive of the FCS field 1325.

FIGS. 14 and 15 are flowcharts representative of example machine accessible instructions that may be executed to perform a dynamic bandwidth change for the example WLAN 100 of FIG. 1. The example machine accessible instructions of FIGS. 14-15 may be executed by a processor, a controller and/or any other suitable processing device. For example, the example machine accessible instructions of FIGS. 14-15 may be embodied in coded instructions stored on a tangible medium such as a flash memory, or RAM associated with a processor (e.g., the example processor 225 discussed above in connection with FIG. 2). Alternatively, some or all of the example flowcharts of FIGS. 14-15 may be implemented using an ASIC, a PLD, a FPLD, discrete logic, hardware, firmware, etc. Also, some or all of the example flowcharts of FIGS. 14-15 may be implemented manually or as combination(s) of any of the foregoing techniques, for example, a combination of firmware, software and/or hardware. Further, although the example machine accessible instructions of FIGS. 14-15 are described with reference to the flowcharts of FIGS. 14-15, persons of ordinary skill in the art will readily appreciate that many other methods of performing a dynamic bandwidth change for the example WLAN 100 of FIG. 1 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 14-15 may be carried out sequentially and/or carried out in parallel by, for example, separate processing threads, processors, devices, circuits, etc.

The example machine accessible instructions of FIG. 14 begin when an initiating STA 110A-D desires to switch the example WLAN 100 of FIG. 1 to 40 MHz operation for a subsequent contention window and/or period. The initiating STA 110A-D creates an RTS2S frame (e.g., the example RTS2S frame of FIG. 13) (block 1405) and then broadcasts the created RTS2S frame to a WLAN (e.g., the example WLAN 100 of FIG. 1) (block 1410).

If a CTS frame is received by the initiating STA 110A-D (block 1415), the initiating STA 110A-D configures its receiver and transmitter (e.g., it wireless modem 210 of FIG. 2) for 40 MHz operation using the current channels (block 1420). The initiating STA 110A-D completes it data transmissions during the subsequent contention period and/or window (block 1425) and then configures its wireless modem 210 to switch back to 20 MHz (block 1430).

Returning to block 1415, if a DCS frame is received by the initiating STA 110A-D (block 1415), the initiating STA 110A-D configures its receiver and transmitter (e.g., it wireless modem 210 of FIG. 2) for 40 MHz operation using the channels specified in the DCS frame (block 1435). The initiating STA 110A-D completes it data transmissions during the subsequent contention period and/or window (block 1440). The example machine accessible instructions of FIG. 14 are then ended.

The example machine accessible instructions of FIG. 15 begin when the example AP 105 and/or an example STA 110A-D receives an RTS2S frame from a STA 110A-D initiating a bandwidth change to 40 MHz operation. The AP 105 and/or receiving STA 110A-D sets and/or updates its NAV based upon the duration contained in the RTS2S frame (e.g., the duration 1310 of FIG. 13) (block 1505).

If the receiving STA 110A-D is 40 MHz capable (block 1510), the receiving STA 110A-D switches to 40 MHz operation (block 1515). Alternatively, the receiving STA 110A-D can skip switching to 40 MHz operation at block 1515. If the receiving STA 110A-D is not 40 MHz capable (block 1510), control proceeds to block 1520.

If the receiving device is an example AP 105 (block 1520), the example AP 105 sends a CTS frame (e.g., formatted and/or having content in accordance with a prevailing standard) with the receiver address field of the CTS frame containing the MAC address of the initiating STA 110A-D (block 1525). Alternatively, the example AP 105 can select new and/or continuing channel(s) and respond with a DCS frame at block 1525. The example machine accessible instructions of FIG. 15 are then ended.

If the receiving device is not an AP (block 1520), the receiving STA 110A-D waits to receive a CTS or DCS frame (block 1530). When the CTS or DCS frame is received (block 1530), the receiving STA 110A-D sets and/or updates its NAV based upon the duration specified in the received CTS or DCS frame (block 1535). The example machine accessible instructions of FIG. 15 are then ended.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for dynamic channel switching comprising:
    during a first contention-free interval of a wireless network, deciding at an access point to configure a dynamic bandwidth change for the wireless network from a first data transmission bandwidth to a second data transmission bandwidth for a subsequent contention-free interval of the wireless network, wherein stations of the wireless network are to transmit during the subsequent contention-free interval using the second data transmission bandwidth, and the second data transmission bandwidth differs from the first data transmission bandwidth;
    transmitting from the access point to the stations of the wireless network during the first contention-free interval a first frame at the first data transmission bandwidth to initiate the dynamic bandwidth configuration change, the first frame including a first field to identify a first channel and a second field to identify a second channel;
    transmitting from the access point to the stations of the wireless network a second frame at the second data transmission bandwidth to end the first contention-free interval and to activate the initiated dynamic bandwidth configuration change of the wireless network to the second data transmission bandwidth; and
    sending a clear-to-send frame on the first channel when the first channel was not previously being used by the wireless network after waiting a time duration that is at least a short interframe spacing plus a switching time.

2. A method as defined in claim 1, wherein the first frame is comprises a dynamic channel switch frame including a receiver address field containing a broadcast address of the access point.

3. A method as defined in claim 1, wherein the bandwidth change is at least one of a change from 20 MHz operation to 40 MHz operation or from 40 MHz operation to 20 MHz operation.

4. A method as defined in claim 1, further comprising, at least one of omitting or leaving blank the second field.

5. A method for dynamic channel switching comprising:
    during a first contention-free interval of a wireless network, deciding at an access point to configure a dynamic bandwidth change for the wireless network from a first data transmission bandwidth to a second data transmission bandwidth for a subsequent contention-free interval of the wireless network, wherein stations of the wireless network are to transmit during the subsequent contention-free interval using the second data transmission bandwidth, and the second data transmission bandwidth differs from the first data transmission bandwidth;
    transmitting from the access point to the stations of the wireless network during the first contention-free interval a first frame at the first data transmission bandwidth to initiate the dynamic bandwidth configuration change, the first frame including a first field to identify a first channel and a second field to identify a second channel; and
    transmitting from the access point to the stations of the wireless network a second frame at the second data transmission bandwidth to end the first contention-free interval and to activate the initiated dynamic bandwidth configuration change of the wireless network to the second data transmission bandwidth, wherein the second frame comprises a contention-free end frame transmitted on at least one of the first channel, the second channel, or a third channel being replaced by at least one of the first or the second channel.

6. A method as defined in claim 5, further comprising waiting a time duration of at least a short interframe spacing before sending the contention-free end frame.

7. A method for dynamic bandwidth change comprising:
    during a first contention-free interval of a wireless network, deciding at an access point to configure a dynamic bandwidth change for the wireless network from a first data transmission bandwidth to a second data transmission bandwidth for a subsequent contention-free interval of the wireless network, wherein stations of the wireless network are to transmit during the subsequent contention-free interval using the second data transmission bandwidth, and the second data transmission bandwidth differs from the first data transmission bandwidth;
    transmitting from the access point to the stations of the wireless network during the first contention-free interval a first frame at the first data transmission bandwidth to initiate the dynamic bandwidth configuration change, the first frame including a first field to identify a first channel and a second field to identify a second channel;
    transmitting from the access point to the stations of the wireless network a second frame at the second data transmission bandwidth to end the first contention-free interval and to activate the initiated dynamic bandwidth configuration change of the wireless network to the second data transmission bandwidth;

receiving the frame at a first station of the wireless network; and configuring at least one of a receiver or a transmitter of the first station based upon the first field and the second field.

8. A method as defined in claim 7, further comprising:

waiting to receive free end the second frame at the first station; and resuming normal operation of the first station at the second data transmission bandwidth after the second frame is received.

* * * * *